US009071515B2

(12) United States Patent
Fumey

(10) Patent No.: US 9,071,515 B2
(45) Date of Patent: Jun. 30, 2015

(54) METHOD AND DEVICE FOR THE VALIDATION OF NETWORKS

(71) Applicant: THALES, Neuilly-sur-Seine (FR)

(72) Inventor: Marc Fumey, Toulouse (FR)

(73) Assignee: Thales, Courbevoie (FR)

( * ) Notice: Subject to any disclaimer, the term of this patent is extended or adjusted under 35 U.S.C. 154(b) by 164 days.

(21) Appl. No.: 13/722,287

(22) Filed: Dec. 20, 2012

(65) Prior Publication Data
US 2013/0163456 A1 Jun. 27, 2013

(30) Foreign Application Priority Data
Dec. 22, 2011 (FR) ...................................... 11 04010

(51) Int. Cl.
H04L 12/26 (2006.01)
H04L 12/813 (2013.01)
H04L 12/841 (2013.01)

(52) U.S. Cl.
CPC ................ *H04L 43/08* (2013.01); *H04L 47/20* (2013.01); *H04L 47/283* (2013.01)

(58) Field of Classification Search
None
See application file for complete search history.

(56) References Cited

U.S. PATENT DOCUMENTS

| 2008/0043768 A1 | 2/2008 | Lopez et al. |
| 2008/0219163 A1 | 9/2008 | Saint Etienne et al. |
| 2008/0221918 A1* | 9/2008 | Petersen et al. ................... 705/2 |

FOREIGN PATENT DOCUMENTS

| EP | 1309140 A1 | 5/2003 |
| EP | 1973282 A1 | 9/2008 |
| FR | 2905047 A1 | 2/2008 |

OTHER PUBLICATIONS

Hussein Charara, et al., "Analysing End-to-End Delays on an AFDX Network by Simulation", Proceedings of the Fifth IASTED International Conference on Communication Systems and Networks, Aug. 28-30, 2006, pp. 171-176, ACTA Press, Anaheim, CA, USA, XP009112179.

* cited by examiner

*Primary Examiner* — Faruk Hamza
*Assistant Examiner* — Diane Lo
(74) *Attorney, Agent, or Firm* — Baker & Hostetler LLP

(57) ABSTRACT

A method is provided for the validation of a network by a checking module, the network comprising a plurality of routers, each of the routers comprising a plurality of output ports, each of the output ports of the routers being associated with a bandwidth budget, a priority latency budget and a plurality of network budget grains. The method comprises, for each of the ports of each of the routers, steps of: calculation of a latency consumed on the output port of the router on the basis of the network budget grains and the bandwidth budget; checking of the compatibility of the latency consumed on the output port with the priority latency budget grains of the output port of the router; and, transmission by the checking module of a signal indicating the result of the check.

16 Claims, 3 Drawing Sheets

METHOD AND DEVICE FOR THE VALIDATION OF NETWORKS

CROSS-REFERENCE TO RELATED APPLICATION

This application claims priority to foreign French patent application No. FR 1104010, filed on Dec. 22, 2011, the disclosure of which is incorporated by reference in its entirety.

FIELD OF INVENTION

The invention relates to the validation of networks and, more particularly, avionic networks.

BACKGROUND

Avionic functions installed in equipment located in a protected area, in a cabin or alongside passengers in an aircraft performing various functions necessary for the accomplishment of a flight, communicate with one another via a network.

Some of these functions being critical, such as, for example, the braking system or the flight management system (FMS), the network allowing them to exchange messages must meet certain determinism constraints and, in particular, guarantee a maximum latency for communications.

For reasons of performance, cost and limitation of aeroplane cabling, choices have tended towards switched networks and the use of the Ethernet standard.

Conventional Ethernet networks do not provide this determinism. In particular, they do not guarantee maximum latency for communications. For this reason, in the domain of avionics, switched Ethernet networks are used, to which a network overlay is added. This overlay is described in the standard ARINC 664.

The operation of this overlay is based on a limitation of the bandwidth and on a distribution of the messages over the network in such a way that it is possible to determine a maximum latency from one end of the network to the other.

The network comprises routers responsible for the transmission of the messages. These routers receive messages via input ports and transmit them via output ports.

On a switched network, regardless of the standard used (Ethernet or other), latency is created mainly by the router output ports. In fact, each of these output ports comprises a queue in which the messages are placed one after the other before being transmitted.

Once a maximum message size and a minimum delay between messages are defined, it is possible to determine a maximum latency for each of the output ports of each router of the network.

The maximum latency from one end of the network to the other therefore depends mainly on the following parameters:
  the maximum size of the messages (also referred to as the maximum frame size),
  the minimum delay between two messages (also referred to as the minimum delay between frames or BAG for Bandwidth Gap),
  the cumulated latency created by the routers on a given path.

According to the prior art, in order to provide a means of segregation between data flows and to guarantee the determinism of these networks, virtual links are defined in such a way that the characteristics essential to the rating of the system are guaranteed over the entire network. A virtual link is a communication channel for which it is possible to define the demonstrated qualities of service (typically bandwidth and latency). In the current prior art relating to switched networks, a virtual link must include the characteristics of spacing (BAG), message size (Maximum Frame Size) and the routing used to transport the messages (links travelled).

Once the virtual links have been defined, these essential characteristics, in particular bandwidth and latency, are guaranteed for each virtual link independently of the use that is made of the other virtual links:
  The bandwidth of a virtual link is available regardless of the use that is made of the other virtual links.
  Latency in the worst case is guaranteed regardless of the use that is made of the other virtual links.
  The definition of a virtual link includes the following parameters:
    the minimum time between two messages (BAG),
    the maximum size of a message (MaxFrameSize), which can be transmitted on this virtual link,
    the links used, i.e. the physical path corresponding to this virtual link, allowing the routers and the ports of the routers used to be identified,
    the priority allowing the latency to be optimised for the most critical data exchanges.
  On the basis of these data, the bandwidth and latency of a virtual link can be determined in the following manner:
    The available bandwidth is equal to the ratio between the maximum size of a message and the minimum time between two messages (MaxFrameSize/BAG).
    Latency (from one end of the network to the other) is determined using a specific algorithm approved for the avionic domain and taking account of all the virtual links defined over the network.
  These two characteristics linked to the virtual links allow the determinism of the network to be guaranteed. However, as seen above, the latency calculation can only be carried out when all the virtual links are defined. This causes the following problems during the definition of a network:
    The virtual links can be defined only when the corresponding data flows are sufficiently characterized, which happens quite late in the definition of the network.
    The knowledge of the links used is required for the definition of the virtual links and therefore for the latency calculation. This is possible only when the architecture of the network is determined.
    The determinism guarantee can only be provided when all the virtual links are defined.
  These constraints do not allow the definition of a network with which latency constraints are associated to be validated in an early manner. In fact, all the VLs must be defined in order to determine whether the latency constraints are respected by the network.

SUMMARY OF THE INVENTION

The invention aims to overcome the aforementioned problems by proposing a method for the validation of a network, allowing a maximum latency to be guaranteed without precisely defining the data flows within the network and, in particular, without defining virtual links.

For this purpose, the subject matter of the invention is the validation of a network by a checking module, the network comprising a plurality of routers, each of the routers comprising a plurality of output ports, each of the output ports of the routers being associated with a bandwidth budget (PBC), a priority latency budget (PLB) and a plurality of network budget grains (NBG), said method being characterized in that it comprises, for each of the ports of each of the routers, the steps of:

calculation of a latency consumed (PortLatency) on the output port of the router on the basis of the network budget grains (NBG) and the bandwidth budget (PBC), checking of the compatibility of the latency consumed (PortLatency) on the output port with the priority latency budget (PLB) of the output port of the router, emission by the checking module of a signal indicating the result of the check.

Advantageously, the network is associated with a plurality of communication channels, each of the communication channels comprising a constraint on a time interval between messages, a maximum transmitted message size and a path comprising a succession of ports crossed, further comprising:

a step of determination of the latency on at least one communication path, and a step of checking the compatibility between the latency of the ports on the path and the priority latency budgets (PLB).

Advantageously, a network budget grain (NBG) comprises the following parameters:

a maximum message size (NBG_MaxFrameSize) for any communication channel which can be associated with this network budget grain, a data size budget (NBG_Size) representing the maximum cumulation in size of the communication channels which can be associated with the network budget grain, a cumulated latency limit (NBG_MaxInputDelay) representing the authorised maximum cumulated latency on the part of the path preceding the port for the communication channels which can be associated with the network budget grain, a constraint on a time interval between messages (NBG_Inter) for the communication channels which can be associated with the network budget grain.

Advantageously, the constraint on a time interval (NBG_Inter) represents a minimum spacing between two messages on a communication channel associated with this network budget grain or a time period between slots reserved for the transmission of messages.

Advantageously, the checking step determines whether the consumed latency (PortLatency) is lower than or equal to the budgeted latency (PLB).

Advantageously, the checking step further comprises:

a step of calculating the bandwidth consumed by an NBG (NBG_Bandwidth) according to the following relation:

$$NBG\_Bandwidth = NBG\_Size/NBG\_Inter$$

where:

NBG_Size is the size budget of the network budget grain and NBG_Inter is the constraint over a time interval between messages, and a step for determining whether, for each of the output ports of the network routers, the sum of the bandwidths of the NBGs associated with this port is less than or equal to the bandwidth budget (PBC) of this port.

Advantageously, the latency consumed (PortLatency) on the output port of the router adheres to the following relation:

$$PortLatency(P_x) = LtcyFo + C_1 + C_2 + C_3$$

where:

$P_x$ is the priority for which the consumed latency is calculated,

LtcyFo is a value representing the latency corresponding to the passage of messages with priorities higher than or equal to $P_x$, $C_1$ is a first correction value representing the latency corresponding to the frame transmission with a priority lower than $P_x$, $C_2$ is a second correction value representing the latency corresponding to the frame transmission with a priority equal to $P_x$, $C_3$ is a third correction value representing the latency corresponding to the frame transmission with a priority higher than $P_x$.

Advantageously, the value (LtcyFo) representing the latency corresponding to the passage of messages of higher or equal priorities adheres to the following relation:

$$LtcyFo(P_x) = \Sigma_{NBG \text{ with a priority higher than or equal to } Px}(NBG\_Size)/PBC$$

where:

NBG_Size is the size budget of the network budget grain, PBC is the bandwidth capacity of the router.

Advantageously, the first correction value (C1) representing the latency corresponding to the message transmission with a priority lower than $P_x$ adheres to the following relation:

$$C1 = Max_{NBG \text{ with a priority lower than } Px}(NBG\_MaxFrameSize)$$

where NBG_MaxFrameSize is the maximum size of a message (MaxFrameSize) for the communication channels associated with this network budget grain NBG.

Advantageously, the second correction value (C2) representing the latency corresponding to the message transmission with a priority equal to $P_x$ adheres to the following relation:

$$C2 = \Sigma_{NBG \text{ with the same priority}} Int(NBG\ MaxInputDelay/NBG\ Inter)*NBG\ Size/PBC$$

where:

NBG MaxInputDelay is the cumulated latency limit for this network budget grain,

NBG_Inter is a period or a minimum time between two messages,

NBG_Size is the size budget of the network budget grain, PBC is the bandwidth capacity of the router.

Advantageously, the third correction value (C3) representing the latency corresponding to the frame transmission with a priority higher than $P_x$ adheres to the following relation:

While C3 increases:

$$C3 = \Sigma_{NBG \text{ with same priority}} Int((NBG\_MaxInputDelay + PortLatency)/NBG\_Inter)*NBG\_Size/PBC$$

where:

NBG MaxInputDelay is the cumulated latency limit for this network budget grain,

PortLatency is the latency consumed (PortLatency) on the output port,

NBG_Inter is a period or a minimum time between two messages,

NBG_Size is the size budget of the network budget grain.

Advantageously, the checking step further establishes the compatibility of a communication path with an NBG of the ports used for the communication by the following relation:

$$\Sigma_{Previous \text{ ports on path}} PLB \leq NBG\_MaxInputDelay$$

where:

PLB is the latency budget for each priority of an output port,

NBG_MaxInputDelay is the cumulated latency limit for this network budget grain.

Advantageously, the checking step further comprises a step for determining whether, for each of the NBGs, the used bandwidth of the NBG (i.e. the sum of the bandwidths of the communication channels associated with this NBG) is less than the bandwidth of the NBG, the fourth check being expressed by the following relation:

$$\Sigma_{CC\ on\ NBG}(CC_{MaxFrameSize}) \leq NBG\_Size$$

where:

$CC_{MaxFrameSize}$ is the maximum size of a message (MaxFrameSize), which can be transmitted on this communication channel, NBG_Size is the size budget of the network budget grain.

The invention also relates to a device for the validation of a network, the network comprising a plurality of routers, each of the routers comprising a plurality of output ports, each of the output ports of the routers being associated with a bandwidth budget (PBC) and a priority latency budget (PLB), said device comprising a memory to store bandwidth budgets (PBC) and priority latency budgets (PLB) and a calculation module carrying out the method according to the invention.

The invention also relates to a router comprising a plurality of output ports, said router comprising a memory to store bandwidth budgets (PBC) and priority latency budgets (PLB) and a calculation module carrying out the method according to the invention.

The method according to the invention has the advantage of directly using latency objectives in the network budgets in contrast to known methods which only offer determinism guarantees which are demonstrable in the long term and globally.

The method according to the invention allows the latency of a port to be calculated and checked independently of the other ports of the network.

The use of the PLB for the latency calculation provides for a linear approach to the latency evaluation.

The latency determination using the method according to the proposed invention uses budgets (i.e. limits) allocated to ports. One of the advantages of the invention is the independence of the ports from one another in the latency evaluation, and, in particular, the disappearance of a dependence of a preceding port on a following port on a communication channel. This characteristic allows network evaluations to be carried out at an early stage in the network design process. Latency is evaluated on potential communication channels (without a real virtual link being identified). This characteristic opens the way to methods for defining networks on the basis of general latency objectives.

BRIEF DESCRIPTION OF THE DRAWINGS

The invention will be better understood and other advantages will become evident from a reading of the detailed description and with the aid of the figures, in which.

The method according to the invention enables the validation of a network comprising routers where each of the routers is associated with a bandwidth budget (PBC) and a priority latency budget (PLB).

DETAILED DESCRIPTION

Figure 1:
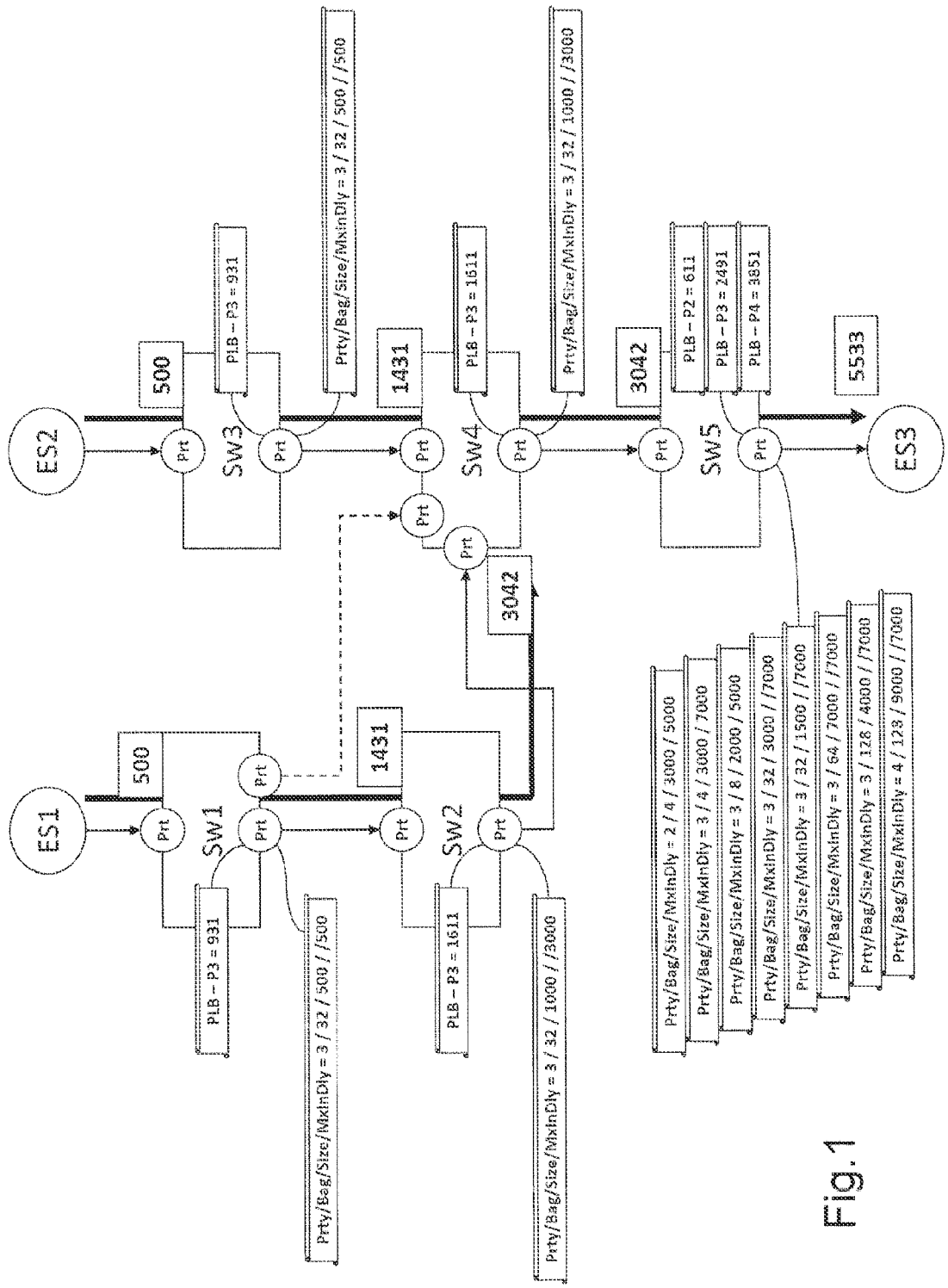
FIG. 1 shows an example of a network to which the method according to the invention can be applied.

FIG. 1 shows an example of a network to which the method according to the invention can be applied. The network interconnects first equipment ES1, second equipment ES2 and third equipment ES3. The network comprises a first router Sw1, a second router Sw2, a third router Sw3, a fourth router Sw4 and a fifth router Sw5.

The latency is a consequence of the sequencing of the data flow on the output ports of the routers. Latency budgets are therefore allocated to these output ports.

The budgets are organised on two levels: the global indicators or global budgets and the grains which represent a fraction of the global budgets. A budget is an available or allocated quantity of a physical resource which cannot be exceeded. The resource is, for example, the bandwidth of the network or the latency of the network.

The capacities of an output port (of a router) are expressed as a bandwidth capacity or PBC (for Port Bandwidth Capability) and a priority latency or PLB (for Port Latency Budget). A bandwidth budget (PBC) and a priority latency budget (PLB) are therefore available for each of the ports of each of the routers of the network.

The bandwidth budget (PBC) represents the bandwidth available on this port. The priority latency budget (PLB) represents the maximum latency of this port for a given priority.

For example, for the fifth router Sw5, a latency budget for priority 2 (PLB-P2) of 611 microseconds, a latency budget for priority 3 (PLB-P3) of 2491 microseconds, and a latency budget for priority 4 (PLB-P4) of 3851 microseconds are available.

These global indicators are broken down into different indicators known as network budget grains (referred to below as NBG). These NBGs correspond to a share of the physical capacities of the port of a router which can be allocated for the purpose of being used for communications, while achieving the following objectives:

being defined independently from one another, allowing the guaranteed calculation of the latency of a port by using only the NBGs of the port, thereby ensuring the independence between a path (followed by a message travelling on the network) and the calculation of latency of the port, allowing a check to be carried out in a port taken in isolation to ensure that a latency budget PLB is not exceeded, allowing the compatibility with the budgets of the communication channels or the virtual links which are to be defined on the network to be checked.

An NBG comprises the following values:

a priority indicating the priority of the virtual links which can be associated with this NBG, a size budget (NBG_Size) representing the envelope (in other words, the sum) of the sizes of the communication channels associated with this NBG, a constraint on a time interval between messages (NBG_Inter) representing a minimum spacing between two messages (referred to as BAG) on a communication channel associated with this network budget grain or representing a time period between slots reserved for the transmission of messages, an authorised maximum delay (of cumulated latency from the transmissions of a message) at the input of the router for any communication channel associated with this NBG (NBG_MaxInputDelay).

The NBG_Size parameter is a data size of the network budget grain, corresponding to a size budget consumed by the Maximum Frame Size parameter of the communication channels associated with this network budget grain.

This definition of the NBGs has the advantage of allowing the latency of an output port of a router to be calculated by using only the budgets defined for this port. The latency calculation is therefore implemented independently of the other ports and independently of the communication paths (in particular the virtual links or communication channels) and their routing.

Figure 2A:
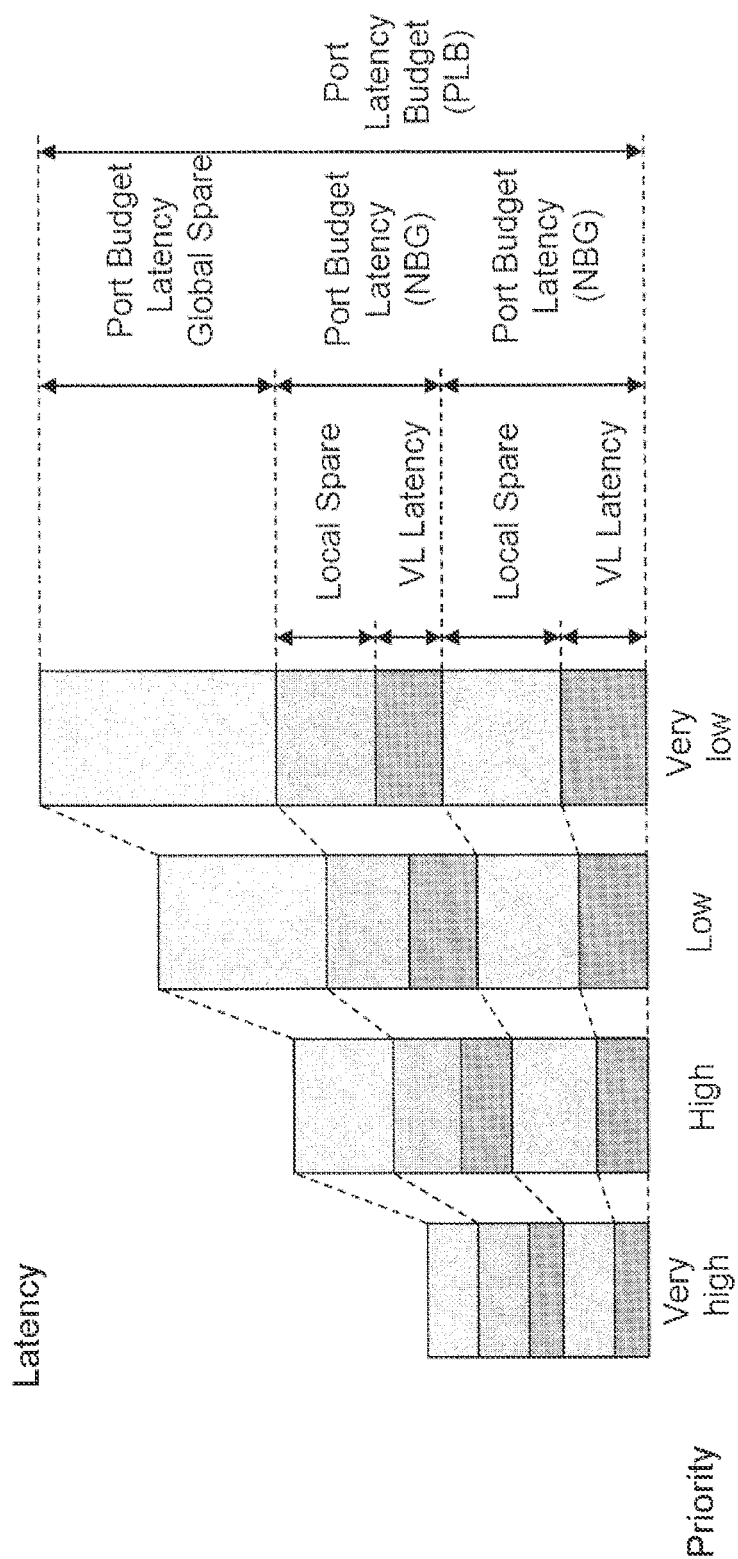
FIGS. 2a and 2b show how bandwidth and latency are distributed in different budgets.
Figure 2B:
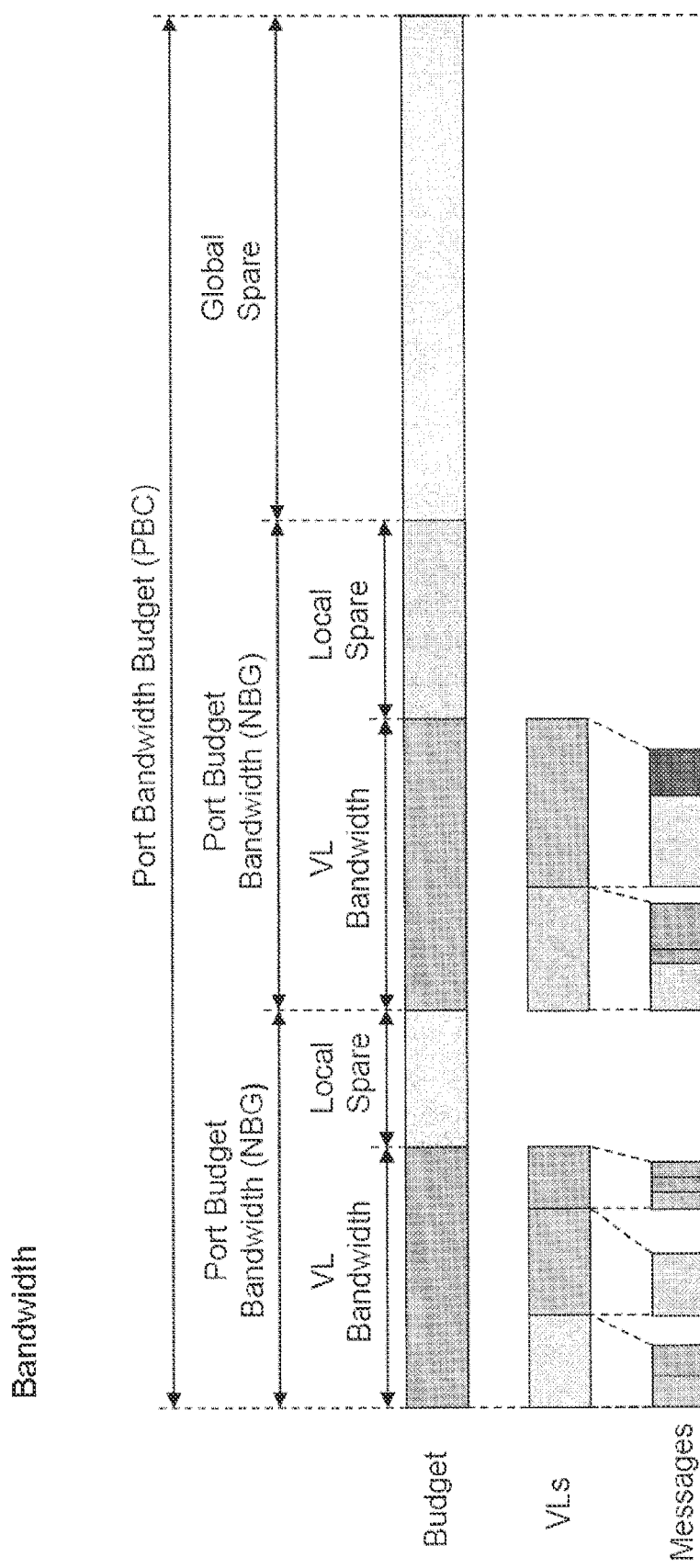

FIGS. 2a and 2b show how the bandwidth and latency are distributed in different budgets. FIG. 2a shows four PLBs, corresponding to each priority (Very high, high, low, very low). NBGs are allocated to the PLBs.

Another advantage resulting from the definition of the PLB and NBG budgets is to allow the evaluation of latency reserves (also known as spares):

The difference between the consumed latency and the budgeted latency is referred to as the local spare.

The difference between the budgeted latency and the capacity of the output port is known as the global spare.

FIG. 2b shows a PLC of an output port of a router to which NBGs are allocated.

The manner in which the bandwidth and latency can be calculated on the basis of the presented values and also associated checks for carrying out the network validation will now be described.

The latency on an output port of a router (PortLatency) can be calculated for a given priority by using the NBGs defined on the port.

The calculations below are given by way of example. The method according to the invention can also be applied with other, more or less precise, latency estimation methods.

The following relations, for example, are used:

$$\text{PortLatency}(P_x) = \text{LtcyFo} + C_1 + C_2 + C_3$$

where:

$P_x$ is the priority for which the latency is calculated,

LtcyFo is a value representing the latency corresponding to the passage of messages with priorities higher than or equal to $P_x$, C1 is a first correction value representing the latency corresponding to the transmission of the largest frame with a priority lower than $P_x$, C2 is a second correction value representing the latency corresponding to the transmission of additional frames with a priority equal to $P_x$, C3 is a third correction value representing the latency corresponding to the transmission of additional frames with a priority higher than $P_x$.

The value (LtcyFo) representing the latency corresponding to the passage of messages of higher or equal priorities adheres to the following relation:

$$\text{LtcyFo}(P_x) = \Sigma_{NBG\ with\ a\ priority\ higher\ than\ or\ equal\ to\ Px} (\text{NBG\_Size})/\text{PBC}$$

where NBG_Size is the data size of the network budget grain, and PBC is the bandwidth capacity of the port.

The first value C1 representing the latency corresponding to the transmission of the largest frame with a priority lower than $P_x$ adheres to the following relation:

$$C1 = \text{Max}_{NBG\ with\ a\ priority\ lower\ than\ Px}(\text{NBG\_MaxFrameSize})$$

where NBG_MaxFrameSize is the maximum size of a message (MaxFrameSize) for any communication associated with this NBG.

The second value C2 representing the latency corresponding to the transmission of additional frames with a priority equal to $P_x$ adheres to the following relation:

$$C2 = \Sigma_{NBG\ of\ same\ priority} \text{int}(\text{NBG\_MaxInputDelay}/\text{NBG\_Inter}) * \text{NBG\_Size}/\text{PBC}$$

where NBG_MaxInputDelay is the authorised maximum cumulated latency delay at the input of the router for the communications associated with this NBG.

The third value C3 representing the latency corresponding to the transmission of additional frames with a priority higher than $P_x$ adheres to the following relation:

$$C3 = \Sigma_{NBG\ with\ a\ higher\ priority} \text{Int}((\text{NBG\_MaxInputDelay} + \text{PortLatency})/\text{NBG\_Inter}) * \text{NBG\_Size}/\text{PBC}$$

where NBG_MaxInputDelay is the authorised maximum cumulated latency delay at the input of the router for the communication channels associated with this NBG.

This correction is calculated in a recursive manner in an iterative loop where the latency of the port is readjusted and results in a new evaluation of C3.

Convergence is ensured if the bandwidth produced by the NBGs does not exceed the capacity of the PBC link.

A first check consists in determining the consistency between latency budgets (PLB) and the network budget grains (NBG). This check is expressed by the following relation:

PortLatency≤PLB for each priority

One of the main advantages of the invention is to be able to carry out this check on each of the ports individually. The invention allows a calculation as simple as that of linear methods of latency evaluation based on PLBs, while offering guarantees similar (in terms of latency behaviour on the network) to more complex evaluation methods.

A plurality of other checks guarantee that a virtual link to be subsequently defined is comparable with the defined budgets.

It is also worth checking that all of the defined communication channels associated with an NBG do not exceed the budget represented by the NBG.

The following checks can advantageously be carried out during the definition of the communication channels or virtual links:

By travelling the path defined by a virtual link or proposed for a communication channel, the cumulated latency on each port crossed by this virtual link can be calculated by the following relation:

$$\text{Cumulated\_Latency}(\text{Port}_x) = \Sigma_{preceding\ ports} \text{PLB}$$

where Cumulated_Latency ($\text{Port}_x$) is the latency cumulated since the transmission before the port $\text{Port}_x$.

The compatibility of the virtual link or the communication channel and its associated NBG can therefore be checked by the following relations:

$$\text{Cumulated\_Latency}(\text{Port}_x) \leq \text{NBG\_MaxInputDelay}$$

$$\text{MaxFrameSize} \leq \text{NBG\_MaxFrameSize}$$

where NBG_MaxInputDelay is the authorised maximum cumulated latency delay at the input of the router for the communications associated with this NBG.

At each time, it will also be possible to check a size rule for each NBG on each port by the following relation:

$$\Sigma_{communication\ channels\ associated\ with\ the\ NBG} \text{MaxFrameSize} \leq \text{NBG\_Size}$$

where NBG_Size is the size budget of the network budget grain.

Each NBG represents a share of the bandwidth of one of the ports of a router. The bandwidth consumed by an NBG (NBG_Bandwidth) is calculated in the following manner:

$$\text{NBG\_Bandwidth} = \text{NBG\_Size}/\text{NBG\_Inter}$$

where NBG_Size is the size budget of the network budget grain and NBG_Inter is a constraint on a time interval between messages.

The following checks can be carried out:

A first check consists in determining, for each of the output ports of the network router, whether the bandwidth (or PBB for Port Budgeted Bandwidth) allocated to this output port (i.e. the sum of the bandwidths of the NBGs associated with this port) is less than the bandwidth budget (PBC) of this port. This check is expressed by the following relation:

$$PBB = \Sigma_{NBG\ of\ the\ Port}(NBG\_Bandwidth) \leq PBC$$

where NBG_Bandwidth is the bandwidth consumed by an NBG and PBC is the bandwidth budget of the port.

Advantageously, a second check can be carried out if the virtual links are determined. The second check consists in determining, for each of the NBGs, whether the used bandwidth of the NBG (i.e. the sum of the bandwidths of the virtual links associated with this NBG) is less than the bandwidth of the NBG. This check is expressed by the following relation:

$$\Sigma_{virtual\ links\ on\ NBG}(VL_{MaxFrameSize}) \leq NBG\_Size$$

where $VL_{MaxFrameSize}$ is the maximum size of a message (MaxFrameSize) which can be transmitted on this virtual link and NBG_Size is the size budget of the network budget grain.

The invention also relates to a device for checking a network, allowing virtual links satisfying the relations presented below to be defined. The device is configured to carry out the method according to the invention, and therefore includes latency and bandwidth budgets. The device carries out the checks associated with these budgets. In this embodiment, the checking module is, for example, a software module run on a generic computer comprising a processor and a storage memory. The signal transmitted by the module is, for example, a message addressed to a man-machine interface displaying the result of the check.

The invention also relates to a router. The router comprises a memory to store PLB and NBG parameters. The router furthermore comprises a calculation module configured to carry out the method according to the invention.

The router according to the invention can check the figuration of the network during its initialisation, and, in particular: the definition of the virtual links, the PLBs and NBGs.

A set of NBGs allocated to a system (for example, an avionic function under the responsibility of a system designer) is a partition of the network inside which it is possible to define virtual links.

As in the case of a memory partition or temporal partition, the checks are defined in such a way as to provide a complete segregation between these partitions. These checks are carried out via the relations between the budgets, in particular the relations between PLB and NBG and the relations between the VLs and the NBGs.

The method according to the invention is illustrated in the network example shown in FIG. 1, of type A664. It is assumed that communications must be set up between applications installed on the equipment ES1, ES2 and ES3. It is assumed that a set latency exists at the output of the equipment ES1, ES2 and ES3 which is set, for example, at 500 μs.

The network comprises five routers Sw1, Sw2, Sw3, Sw4 and Sw5. Each of the routers is associated with a PLB for the messages of priorities 3 (denoted PLB-P3), for Sw1 this is PLB-P3=931 μs, for Sw2 this is PLB-P3=1631 μs, for Sw3 this is PLB-P3=931 μs, for Sw4 this is PLB-P3=1631 μs, and for Sw5 this is PLB-P3=2491 μs.

NBGs (shown in blue) are defined for the output ports of the routers and are allocated to the different applications.

Among these NBGs, a distinction is made in respect of NBGs with a priority of 3 and a BAG of 32. These NBGs are allocated for our system (avionic function—for example "Landing Gear").

The system is free to define virtual links between the equipment ES1 or ES2 and ES3. It is limited only by the defined NBGs and PLBs.

For example, virtual links with priorities of 3 and a BAG of 32 can be defined from the second equipment ES2 to the third equipment ES3 via the third router Sw3, the fourth router Sw4 and the fifth router Sw5. The maximum guaranteed latency, calculated by using the PLBs, is 5533 μs.

Virtual links with priorities of 3 and a BAG of 32 cannot be defined from the first equipment ES1 to the third equipment ES3 via the first router Sw1, the second router Sw2, the fourth router Sw4 and the fifth router Sw5 since the cumulated latency, calculated by using the PLBs, is greater than the MaxInputDelay parameter on the input port of the router Sw4.

Virtual links with priorities of 3 and a BAG 32 could be defined from the first equipment ES1 to the third equipment ES3 via the first router Sw1, the fourth router Sw4 and the fifth router Sw5 if an identical NBG was defined on the output port of the first router Sw1 connected to the fourth router Sw4 (an example of independent evaluation of a predefined path or a virtual link can be seen here).

The method according to the invention can be used in a method for defining a network with latency constraints. A definition method of this type comprises the following steps.

A first step comprises the definition of latency objectives between the transmit ports and the receive ports.

A second step comprises the definition of latency budgets on the output ports (PLB) compatible with the objectives set in the preceding step.

A third step comprises the determination of the main characteristics of the budgets, (in particular the parameters NBG_Size and DelayIn) on the basis of the PLBs. This step enables the validation of a network in an early manner, in particular even before having defined the data flows and virtual links.

These different steps can be partially automated, and the simplicity of the evaluation of the latencies at a global level (linear with the PLBs) allows design-aiding algorithms to be envisaged. It is therefore possible to compare different network architecture alternatives and to select the best in terms of, for example, the number of routers, the number of cables interconnecting the equipment, the latencies or the latency spare.

Advantageously, the method for defining a network with latency constraints further comprises a fourth step comprising the multiplication of the NBGs and their distribution to third parties participating in the definition of the network. The distribution of NBGs to third parties allows them to define virtual links on identified ports. If these virtual links adhere to the definition of the NBGs, latency is guaranteed on the network.

A fifth step comprises the definition of virtual links by third parties on the basis of the distributed NBGs.

A sixth step comprises the validation of the network in terms of the latency constraints defined using the method according to the invention.

The invention claimed is:

1. A method for the validation of a network by a checking module, the network comprising a plurality of routers, each of the routers comprising a plurality of output ports, each of the output ports of the routers being associated with a bandwidth budget, a priority latency budget and a plurality of network budget grains, said method comprising, for each of the ports of each of the routers, the steps of:

calculation of a latency consumed on the output port of the router on the basis of the network budget grains and the bandwidth budget, checking of the compatibility of the latency consumed on the output port with the priority latency budget of the output port of the router, and emission by the checking module of a signal indicating the result of the check, wherein the steps of calculation, checking, and emission are carried out without defining virtual links in the network.

2. The method for the validation of a network according to claim 1, the network being associated with a plurality of communication channels, each of the communication channels comprising a constraint on a time interval between messages, a maximum transmitted message size and a path comprising a succession of ports crossed, the method further comprising:

a step of determination of the latency on at least one communication path, and a step of checking the compatibility between the latency of the ports on the path and the priority latency budgets.

3. The method for the validation of a network according to claim 2, in which a network budget grain comprises the following parameters:

a maximum message size for any communication channel which can be associated with this network budget grain, a data size budget representing the maximum cumulation in size of the communication channels which can be associated with the network budget grain, a cumulated latency limit representing the authorised maximum cumulated latency on the part of the path preceding the port for the communication channels which can be associated with the network budget grain, a constraint on a time interval between messages for the communication channels which can be associated with the network budget grain.

4. The method for the validation of the network according to claim 3, in which the constraint on a time interval represents a minimum spacing between two messages on a communication channel associated with this network budget grain or a time period between slots reserved for the transmission of messages.

5. The method for the validation of a network according to claim 1, in which the checking step determines whether the consumed latency is less than or equal to the budgeted latency.

6. The method for the validation of a network according to claim 1, in which the checking step further comprises:

a step of calculating the bandwidth consumed by an NBG (NBG_Bandwidth) according to the following relation:

$$NBG\_Bandwidth = NBG\_Size/NBG\_Inter$$

where:
NBG_Size is the size budget of the network budget grain and NBG_Inter is the constraint on a time interval between messages, and a step for determining whether, for each of the output ports of the network routers, the sum of the bandwidths of the NBGs associated with this port is less than or equal to the bandwidth budget (PBC) of this port.

7. The method for the validation of a network according to claim 1, in which the latency consumed (PortLatency) on the output port of the router adheres to the following relation:

$$PortLatency(P_x) = LtcyFo + C_3 + C_2 + C_3$$

where:
$P_x$ is the priority for which the consumed latency is calculated,
LtcyFo is a value representing the latency corresponding to the passage of messages with priorities higher than or equal to $P_x$,
C1 is a first correction value representing the latency corresponding to the frame transmission with a priority lower than $P_x$,
C2 is a second correction value representing the latency corresponding to the frame transmission with a priority equal to $P_x$,
C3 is a third correction value representing the latency corresponding to the frame transmission with a priority higher than $P_x$.

8. The method for the validation of a network according to claim 7, in which the value (LtcyFo) representing the latency corresponding to the passage of messages with higher or equal priorities adheres to the following relation:

$$LtcyFo(P_x) = \Sigma_{NBG\ with\ a\ priority\ higher\ than\ or\ equal\ to\ Px}(NBG\_Size)/PBC$$

where:
NBG_Size is the size budget of the network budget grain,
PBC is the bandwidth capacity of the router.

9. The method for the validation of a network according to claim 7, in which the first correction value (C1) representing the latency corresponding to the transmission of messages with a priority lower than $P_x$ adheres to the following relation:

$$C1 = Max_{NBG\ with\ a\ priority\ lower\ than\ Px}(NBG\_MaxFrameSize)$$

where NBG_MaxFrameSize is the maximum size of a message (MaxFrameSize) for the communication channels associated with this network budget grain NBG.

10. The method for the validation of a network according to claim 7, in which the second correction value (C2) representing the latency corresponding to the transmission of messages with a priority equal to $P_x$ adheres to the following relation:

$$C2 = \Sigma_{NBG\ with\ the\ same\ priority}Int(NBG\ MaxInputDelay/NBG\ Inter)*NBG\ Size/PBC$$

where:
NBG MaxInputDelay is the cumulated latency limit for this network budget grain,
NBG_Inter is a period or a minimum time between two messages,
NBG_Size is the size budget of the network budget grain,
PBC is the bandwidth capacity of the router.

11. The method for the validation of a network according to claim 7, in which the third correction value (C3) representing the latency corresponding to the frame transmission with a priority higher than $P_x$ adheres to the following relation:
While C3 increases:

$$C3 = \Sigma_{NBG\ with\ same\ priority}Int((NBG\_MaxInputDelay + PortLatency)/NBG\_Inter)*NBG\_Size/PBC$$

where:
NBG MaxInputDelay is the cumulated latency limit for this network budget grain,
PortLatency is the latency consumed (PortLatency) on the output port, NBG_Inter is a period or a minimum time between two messages, NBG_Size is the size budget of the network budget grain.

12. The method for the validation of a network according to claim 1, in which the checking step further establishes the compatibility of a communication path with an NBG of the ports used for the communication by the following relation:

$$\Sigma_{Previous\ ports\ on\ path} PLB \leq NBG\_MaxInputDelay$$

where:

PLB is the latency budget for each priority of an output port,

NBG_MaxInputDelay is the cumulated latency limit for this network budget grain.

13. The method for the validation of a network according to claim 1, in which the checking step further comprises a step for determining whether, for each of the NBGs, the used bandwidth of the NBG (i.e. the sum of the bandwidths of the communication channels associated with this NBG) is less than the bandwidth of the NBG, a fourth check being expressed by the following relation:

$$\Sigma_{CC\ on\ NBG}(CC_{MaxFrameSize}) \leq NBG\_Size$$

where:

$CC_{MaxFrameSize}$ is the maximum size of a message (MaxFrameSize), which can be transmitted on this communication channel, NBG_Size is the size budget of the network budget grain.

14. A device for the validation of a network, the network comprising a plurality of routers, each of the routers comprising a plurality of output ports, each of the output ports of the routers being associated with a bandwidth budget and a priority latency budget, said device comprising a memory to store bandwidth budgets and priority latency budgets and a calculation module carrying out the method according to claim 1.

15. A router comprising a plurality of output ports, said router comprising a memory to store bandwidth budgets and priority latency budgets and a calculation module carrying out the method according to claim 1.

16. A method for the validation of a network by a checking module, the network comprising a plurality of routers, each of the routers comprising a plurality of output ports, each of the output ports of the routers being associated with a bandwidth budget, a priority latency budget and a plurality of network budget grains, said method comprising, for each of the ports of each of the routers, the steps of:

calculation of a latency consumed on the output port of the router on the basis of the network budget grains and the bandwidth budget, checking of the compatibility of the latency consumed on the output port with the priority latency budget of the output port of the router, and emission by the checking module of a signal indicating the result of the check, wherein the network is associated with a plurality of communication channels, each of the communication channels comprising a constraint on a time interval between messages, a maximum transmitted message size and a path comprising a succession of ports crossed, the method further comprising:

a step of determination of the latency on at least one communication path, and a step of checking the compatibility between the latency of the ports on the path and the priority latency budgets, wherein a network budget grain comprises the following parameters:

a maximum message size for any communication channel which can be associated with this network budget grain, a data size budget representing the maximum cumulation in size of the communication channels which can be associated with the network budget grain, a cumulated latency limit representing the authorised maximum cumulated latency on the part of the path preceding the port for the communication channels which can be associated with the network budget grain, a constraint on a time interval between messages for the communication channels which can be associated with the network budget grain.

* * * * *

UNITED STATES PATENT AND TRADEMARK OFFICE
CERTIFICATE OF CORRECTION

PATENT NO.         : 9,071,515 B2  
APPLICATION NO.    : 13/722287  
DATED              : June 30, 2015  
INVENTOR(S)        : Marc Fumey Page 1 of 1

It is certified that error appears in the above-identified patent and that said Letters Patent is hereby corrected as shown below:

In the claims:

Col. 12
In line 4 of claim 7, "PortLatency($P_x$)=LtcyFo+$C_3$+$C_2$+$C_3$" should be
--PortLatency($P_x$)=LtcyFo+$C_1$+$C_2$+$C_3$--.

Signed and Sealed this
Twenty-ninth Day of December, 2015

Michelle K. Lee
*Director of the United States Patent and Trademark Office*